United States Patent Office 3,491,024
Patented Jan. 20, 1970

3,491,024
2,6-DISUBSTITUTED PRIMARY ARYL PHOSPHITES, THEIR SALTS AND PHOSPHORODIHALIDITES AND PROCESSES FOR THE MANUFACTURE THEREOF
Francis M. Kujawa, Tonawanda, and Alvin F. Shepard and Bobby F. Dannels, Grand Island, N.Y., assignors to Hooker Chemical Corporation, Niagara Falls, N.Y., a corporation of New York
No Drawing. Continuation-in-part of application Ser. No. 423,583, Jan. 5, 1965. This application Sept. 15, 1967, Ser. No. 668,172
Int. Cl. C10m 1/46, 3/40
U.S. Cl. 252—32.5                 8 Claims

ABSTRACT OF THE DISCLOSURE

Organic substances, such as petroleum hydrocarbons and polyolefins, are protected against peroxidation, as by an oxygen-containing gas, at elevated temperatures, by incorporating therein a minor proportion, such as 0.1 to 5 percent, of a primary aryl phosphite of the formula:

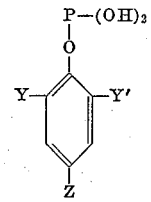

wherein Y and Y' are organic radicals of at least 4 carbon atoms and Z is either hydrogen, halogen, or an organic radical of at least 4 carbon atoms.

---

This is a continuation-in-part of our application S.N. 423,583, filed Jan. 5, 1965, now Patent No. 3,412,118, a continuation-in-part of Ser. No. 220,902, filed Aug. 31, 1962, issued Sept. 6, 1966 as U.S. Patent 3,271,481.

This invention relates to novel organo-phosphorus compounds and their corresponding salts. More specifically, this invention relates to novel primary aryl phosphites and the salts of said primary aryl phosphites, and uses thereof.

The primary aryl phosphites of this invention have the formula:

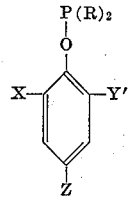

wherein R is selected from the group consisting of hydroxyl and halogen radicals, Y and Y' are organic radicals containing at least four carbon atoms, and Z is selected from the group consisting of hydrogen, halogen, and organic radicals containing at least four carbon atoms.

The metal salts of the primary aryl phosphites of this invention have the formulas:

(A)
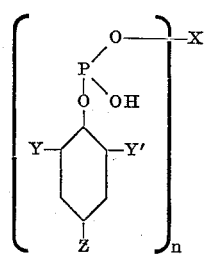

(B)
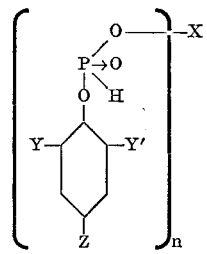

wherein Y and Y' are organic radicals containing at least four carbon atoms, Z is selected from the group consisting of hydrogen, halogen, and organic radicals containing at least four carbon atoms, X is selected from the group consisting of ammonium, substituted ammonium radical and metal radical, and $n$ is an integer from 1 to 4 representing the valence of X. Two formulas have been illustrated to show that two forms of primary phosphites are believed to exist. However, Formula A will be used throughout this application as the presently preferred form.

The primary aryl phosphites of this invention and their salts are useful as stabilizers, plasticizers, gasoline or lubricating oil additives and flame-retarding agents.

Usually, primary aryl phosphites of the art, including the corresponding salts, are too unstable to moisture to permit their general usage. Unless products containing them are carefully guarded against moisture, these phosphites and their salts hydrolyze, yielding phosphorous acid or salts of phosphorous acid, and the parent phenol or phenols. The phosphorus acid set free is usually objectionable because of its tendency to attack metal, the skin or clothing with which it may come into contact. Free phosphorus acid or its salts are also health hazards, since they may decompose on mild heating to form the highly poisonous gas, phosphine. The phenols liberated on hydrolysis of the phosphites are likewise undesirable because of their unpleasant "carbolic acid" odor and their tendency to discolor on standing.

An object of this invention is to provide novel organo-phosphorous compounds and their corresponding salts.

A further object of this invention is to provide stable primary aryl-phosphites and stable salts of the primary aryl phosphites.

Another object of this invention is to provide a process of preparing stable primary aryl phosphites and stable metal salts thereof.

These and other objects of the invention will become apparent from the following detailed description.

It has been found that by reacting phenols, substituted in at least certain two positions with organic radicals containing at least four carbon atoms, with a phosphorous trihalide, under conditions which facilitate removal of halogen acid, a primary aryl phosphorodihalidite is obtainable which is then hydrolyzable to a stable primary aryl phosphite. In addition, the primary aryl phosphites of this invention may be reacted with a reactive metal or a reactive metal compound to yield stable metal salts of the compounds of this invention.

The primary aryl phosphites of the invention are prepared by reacting a di- or tri-substituted phenol with a phosphorous tri-halide in the presence of a tertiary amine at room temperature, and preventing the accumulation of halogen acid. Triethylamine facilitates the removal of the halogen acid formed by the reaction, thus, increasing the rate of reaction. Other tertiary amines that may be employed include pyridine, quinoline and tributyl amine. Other conditions which facilitate the removal of the halogen acid are:

(1) Addition of an insoluble basic substance, for example, lime; and (2) Prolonged heating together of the phenol and the halide.

The substituted phenols, or their salts, which may be used in the invention are characterized by the following formula:

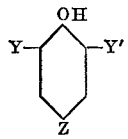

wherein Y and Y' are organic radicals containing at least four carbon atoms and Z is selected from the group consisting of hydrogen, halogen and organic radicals containing at least four carbon atoms.

It is preferred to select Y and Y' from the group consisting of alkyl of 4 to 12 carbon atoms or aralkyl of 7 to 12 carbon atoms, and to select Z from the group consisting of hydrogen, chlorine, bromine, alkyl of 4 to 12 carbon atoms or aralykyl of 7 to 12 carbon atoms. The joining carbon of the alkyl and aralkyl radicals of Y, Y' and Z is preferably a tertiary carbon.

The substituted phenols which may be used in practicing this invention are characterized by the following formulas:

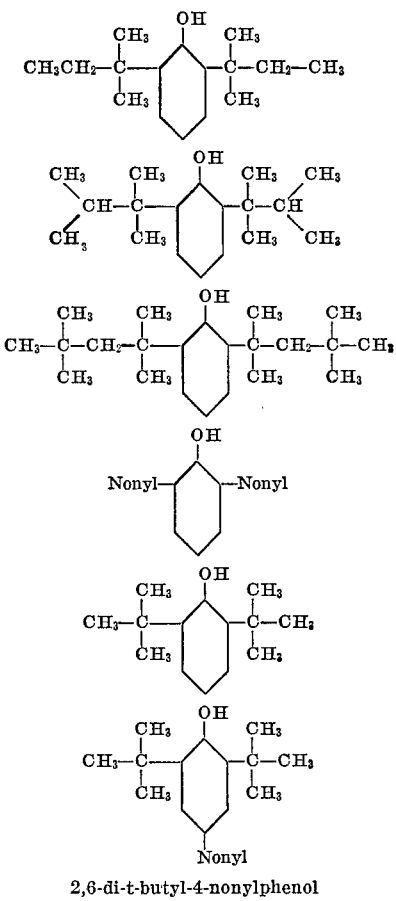

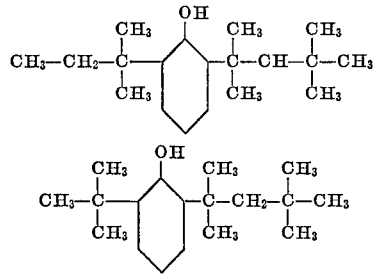

2,6-di-t-butyl-4-nonylphenol

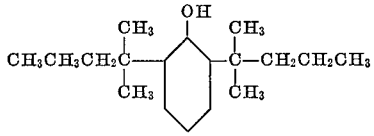

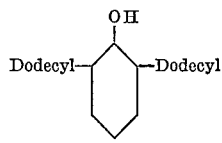

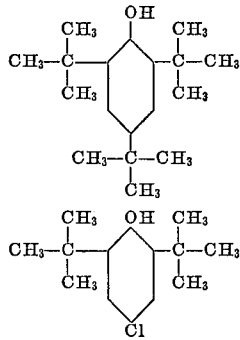

2,6-di-t-butyl-4-chlorophenol

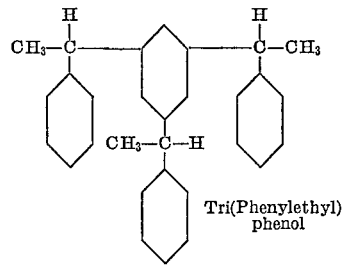

Tri(Phenylethyl)phenol

Additional tri-substituted phenols that can be used are 2,6-di-t-butyl-4-t-amylphenol,
2,6-di-t-butyl-4-cyclohexylphenol,
2,6-di-t-butyl-4-phenylphenol,
2,6-di-t-butyl-4-diisobutylphenol,
2,6-di-t-butyl-4-benzylphenol,
2,4-di-t-butyl-6-phenylphenol,
2,4-di-t-amyl-6-t-butylphenol, and the like.

It has been found that phenols substituted in the 2,6- and 2,4,6-position give products prepared by the process set forth herein which are found to be of high stability to hydrolysis. The products of the 2,4,6-tri-substituted phenols are even more stable than the products of the 2,6-di-substituted phenols.

The temperature and pressure at which the reaction for the preparation of the aryl phosphites is carried out are dictated largely by convenience and depend upon the boiling point of the phosphorus trihalide used. Thus, the boiling point of phosphorus trichloride is 76 degrees centigrade and to react this composition much above 76 degrees centigrade would require pressure equipment. It is preferred to use temperatures in the range of 0 degrees centrigrade to 100 degrees centigrade. Also, sub-atmospheric and super-atmospheric pressures can be used if desired.

The reaction is controlled as to the phosphite obtained by the ratio of reactants used. Thus, it is preferred to use a molar excess of phosphorus trihalide or at least about one mole of phosphorus trihalide per mole of substituted phenol.

The phosphorus trihalide may be phosphorus trichloride, phosphorus triodide, phosphorus tribromide and phosphorus trifluoride. It is preferred for purposes of this invention to use phosphorus trichloride and more preferred to use phosphorus trichloride in the liquid state.

The reaction is completed when, in the presence of the tertiary amine, a precipitate no longer continues to form. Another way to test for completion of the reaction is to analyze for the halide and determine that the evolution of halogen acid is complete.

In the process as described herein, the 2,6-di-t-alkylphenyl, the 2,6-di-t-aralkylphenyl, 2,4,6-tri-t-alkylphenyl and 2,4,6 - tri - aralkylphenyl phosphorodichloridites are formed as intermediates. These can be hydrolyzed to their corresponding primary phosphites or they may be recovered as such.

It has been found that the 2,4,6-tri-substituted alkyl phenols and 2,4,6-tri-substituted aralkylphenols produce primary aryl phosphites which possess greater stability than the 2,6-di-substituted primary aryl phosphites, as illustrated in Table I. Note that both the di- and tri-substituted compounds of this invention are superior to unsubstituted phosphites. Triphenyl phosphite and trilauryl phosphite were used as standards. This was done because the unsubstituted primary phosphites such as $C_6H_5OP(OH)_2$ are very difficult to isolate and keep, and it is justified by the fact that $C_6H_5OP(OH)_2$ must be an intermediate in the hydrolysis of triphenyl phosphite. Thus, it is apparent that a comparison with $C_6H_5OP(OH)_2$ would have shown the primary phosphites of the present invention to even greater advantage. In all cases, degree of hydrolysis to $H_3PO_3$ were measured, the test samples being refluxed with the aqueous reagent for the time indicated and $H_3PO_3$ being measured by titration of the hydrolysis products for the weakly acid second hydrogen of $H_3PO_3$.

As previously indicated, the metal, ammonium and substituted ammonium salts of the primary aryl phosphites disclosed herein are also within the scope of this invention. The metal salts are prepared by reacting a novel primary aryl phosphite of this invention with a reactive metal or reactive metal compound to yield the corresponding metal salt of the primary aryl phosphite. The reaction may be carried out by mixing together the reactants and then, if desired, heating the same to an elevated temperature until the reaction is complete. There may also be present during the reaction or upon completion of the reaction, suitable solvents for the reactants or reaction products, such as, water, chloroform, diethyl ethers and the like.

The metals which may be incorporated into the compounds of this invention may be broadly classified as the metals of Group 1 to 8 inclusive of the Periodic Table of Elements. These metals comprise the following: lithium, sodium, potassium, rubidium, caesium, beryllium, magnesium, calcium, strontium, barium, zinc, cadmium, mercury, scandium, aluminum, gallium, indium, thallium, titanium, zirconium, cerium, thorium, germanium, tin, lead, vanadium, columbium, tantalum, arsenic, antimony, bismuth, chromium, molybdenum, tungsten, uranium, rhenium, manganese, iron, cobalt, and nickel.

Particularly preferred of these metals, however, are sodium, potassium, copper, cobalt, lead, calcium, zinc, iron, nickel, tin, chromium. Generally, these metals are employed as salts or hydroxides. Typical examples are sodium hydroxide, lead acetate, zinc chloride, chromium nitrate, and the like.

The temperature and pressure at which the salts of this invention are prepared are dictated largely by convenience. Suitable operable temperatures may range from ambient temperature such as 20 degrees centigrade to 200 degrees centigrade. Conveniently, atmospheric pressures are utilized. However, it is within the scope of this invention to employ sub-atmospheric and super-atmospheric pressures.

The non-metallic salts of the primary phosphites of this invention, such as ammonium salt are prepared by the reaction of a compound derived from ammonia and a primary phosphite of this invention. As the compounds derived from ammonia, there can be used ammonium compounds, and substituted ammonium compounds, such as amines and quaternary ammonium compounds. Typical examples of these include methylamine, dimethylamine, trimethylamine, ethylamine, propylamine, ammonia, ammonium hydroxide, tetramethyl ammonium hydroxide, tetramethyl ammonium chloride and the like.

TABLE I

| Compound | Time for 50% Hydrolysis to $H_3PO_3$ | | |
|---|---|---|---|
| | $H_2O$ | 0.05 N, NaOH | 0.05 N, HCl |
| Triphenyl phosphite | 50 min | 50 min | |
| Trilauryl phosphite | 110 min | | |
| 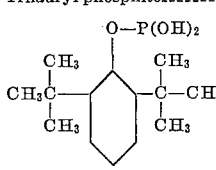 | 180 min | 120 min | |
| 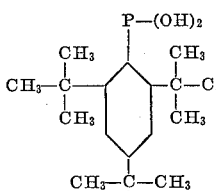 | 0%, 41 hrs | 0%, 50 hrs | 48%, 22 hrs |
| 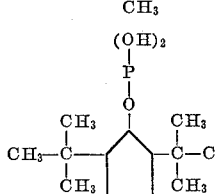 | 25%, 8 hrs | | |

When equimolar amounts of a salt such as of the lead salt of 2,6-di-t-butylphenyl phosphite, the copper salt of 2,4,6-tri-t-butylphenyl phosphite, the iron salt of 2,6-di-t-butyl-4-chlorophenyl phosphite and the like are added to water in place of the above-described primary aryl phosphites, corresponding results are obtained.

The primary aryl phosphites of this invention and their corresponding salts may be utilized as stabilizers in a variety of organic substances such as resins and polyolefins, as plasticizers in polyvinyl chloride, and as gasoline or lubricating oil additives. Typical polyolefins which may be advantageously stabilized by the process of this invention includes for example, polyethylene, polypropylene, and the like. A preferred embodiment is the process of stabilizing polypropylene. In addition, the primary aryl phosphites of this invention and their corresponding salts may be added to organic substances which in the presence of an oxygen-containing gas deteriorate, especially at elevated temperatures.

The phosphite inhibit the peroxidation of these compositions. The organic substances include hydrocarbons such as 1,3,5-triisopropyl benzene, petroleum hydrocarbon oils, substances previously mentioned above, and the like.

To prepare the preferred lubricants of this invention, an appropriate quantity of the primary aryl phosphite, salt, or mixtures thereof are blended with the base oil to be protected.

Suitable base oils include mineral oils and also synthetic diester oils, such as sebacates, adipates, etc., which find particular use as aircraft instrument oils, hydraulic and damping fluids, and precision bearing lubricants. All of these oils are normally susceptible to oxidative deterioration, especially at elevated temperatures.

The finished lubricants of this invention have much greater oxidation stability and many other improved performance characteristics as compared with the corresponding base oils. In the case of lubricating oils of this invention, spectacular improvements are afforded, including markedly reduced engine wear characteristics, greatly improved oxidation stability and greatly reduced bearing corrosion properties.

The following examples illustrate various specific embodiments of this invention. The physical characteristics of the illustrative oils used in Examples 20–25 are as shown in Table I.

The following examples are presented to illustrate the invention more fully without any intent to limit the invention thereby. All temperatures are in degrees centigrade, and parts are by weight, unless otherwise indicated.

EXAMPLE 1

Preparation of 2,6-di-t-butylphenyl phosphorodichloridite

A mixture of 500 parts $PCl_3$ and 228 parts dry sodium salt of 2,6-di-t-butylphenol was refluxed at about 80 degrees centigrade for about one day. On filtering off precipitated sodium chloride and distilling the remaining liquid in vacuum through a short column, 2,6-di-t-butylphenyl phosphorodichloridite was obtained as a pale yellow liquid. The liquid contained 54.8 percent carbon, 6.5 percent hydrogen, 10.0 percent phosphorus and 23.4 percent chlorine.

The calculated percentages of these elements in the phosphorodichloridite $C_6H_3(C_4H_9)_2OPCl_2$, are 54.73 percent carbon, 6.89 percent hydrogen, 10.08 percent phosphorus and 23.09 percent chlorine.

EXAMPLE 2

Preparation of primary 2,6-di-t-butylphenyl phosphite

To 50 parts of water, there was added 8.8 parts of 2,6-di-t-butylphenyl phosphodichloridite. After stirring at room temperature overnight, the white solid primary 2,6-di-t-butylphenylphosphite that formed was filtered off. After recrystallization from hexane, it melted at 136.5–138 degrees centigrade. It contained 62.2 percent carbon, 8.7 percent hydrogen, 11.6 percent phosphorus, 0 percent chlorine. The calculated percentages of these elements in the primary 2,6-di-t-butylphenyl phosphite are 62.0 percent carbon, 8.5 percent hydrogen, 11.4 percent phosphorus, 0 percent chlorine.

EXAMPLE 3

Preparation of 2,4,6-tri-t-butylphenylphosphorodichloridite

To a mixture of 463 parts of $PCl_3$ and 121.4 parts of triethylamine there were slowly added 265 parts of 2,4,6-tri-t-butylphenol at 10 degrees centigrade. The reactor was maintained under a small positive nitrogen pressure to exclude atmospheric moisture. The mixture was then heated at reflux (105 degrees centigrade) for 6 hours. The solid amine hydrochloride was filtered off and thoroughly washed with petroleum ether. The combined wash and filtrate was distilled and a fraction boiling at 119–124 degrees centigrade/0.4–0.5 mm., was collected. It solidified upon cooling to a colorless crystalline solid 2,4,6-tri-t-butylphenylphosphorodichloridite melting at 79–83 degrees centigrade. This amounted to 313 parts (85 percent of theory). It contained 18.8 percent chlorine; the calculated percentage of chlorine in $C_{18}H_{29}OPCl_2$ is 19.5 percent chlorine.

EXAMPLE 4

Preparation of primary 2,4,6-tri-t-butylphenyl phosphite

The 313 parts of phosphorodichloridite of Example 3 were ground and slurried with 4,000 parts of water for 2 hours. The resulting solid was washed with water and then dried. After recrystallization from dimethoxyethane, it melted with decomposition at 185 degrees centigrade. It formed a monosodium salt that is approximately 20 weight percent soluble in $H_2O$ at 20 degrees centigrade. It contained 67.1 percent carbon, 9.8 percent hydrogen, 9.7 percent phosphorus. The calculated percentages of these elements for $C_{18}H_{31}PO_3$ are 66.3 percent carbon, 9.5 percent hydrogen, 9.5 percent phosphorus.

EXAMPLE 5

Preparation of primary 2,4,6-tri-t-butylphenylphosphite

A mixture of 3,787 parts of $PCl_3$ and 833 parts of triethylamine was charged to a pot reactor from which moisture was excluded. A total of 1,875 parts of 2,4,6-tri-t-butylphenol were added in small increments over a two-hour period at 7–15 degrees centigrade. The reaction mixture was then refluxed for 5.5 hours. The solid amine hydrochloride was then filtered off and washed with petroleum ether. The wash and filtrate were combined and the solvent, unreacted $PCl_3$ and amine were stripped off. The residue was hydrolyzed by treatment with a large volume of water. The resulting solid was washed with water and then with n-hexane. Upon drying, 1,976 parts of primary phosphite were obtained that, without further treatment, had a titer indicating 99.9 percent purity.

EXAMPLE 6

Preparation of primary 2,6-di-t-butyl-4-nonyl-phenylphosphite and 2,6-di-t-butyl-4-nonylphenylphosphorodichloridite In a manner similar to that of Example 5, a solution of 49.3 parts of 2,6-di-t-butyl-4-nonylphenol in 19.2 parts of triethylamine was reacted with 254 parts of $PCl_3$. The reaction was complete at room temperature; therefore, the heating period was eliminated. Upon distillation 24 parts of the phosphorodichloridite were obtained. It boiled at 148–154 degrees centigrade, 0.25 mm., and contained 16.5 percent chlorine, 7.03 percent phosphorus. The calculated percentages for these elements are 16.4 percent chlorine, 7.16 percent phosphorus. Hydrolysis of this product yielded the primary phosphite as a viscous oil. Dilute aqueous solutions of the sodium salt of this material had outstanding surface active properties.

EXAMPLE 7

Preparation of primary 2,6-di-t-butyl-4-chlorophenylphosphite

In a manner similar to that of Example 5, a mixture of 72.1 parts of 2,6-di-t-butyl-4-chlorophenol and 38 parts of triethylamine was reacted with 427 parts $PCl_3$. The heating period was 5.5 hours at 78 to 79 degrees centigrade. The phosphorodichloridite boiled at 156 to 166 degrees centigrade/2.6 mm. and 36.7 parts were obtained. Hydrolysis of this material by treatment with 1,000 parts of water yielded the primary phosphite which, after crystallization from dimethoxyethane, melted with decomposition at 140 to 142 degrees centigrade. It is a strong monobasic acid with a titer indicating 99.2 percent purity. It contained 10.0 percent phosphorus, 11.4 percent chlorine. The calculated percentages of these elements in primary 2,6-di-t-butyl-4-chlorophenylphosphite are 10.17 percent phosphorus and 11.63 percent chlorine.

EXAMPLE 8

Preparation of 2,4,6-triphenylethylphenylphosphite

Using a procedure similar to that of Example 3, a solution of 101 parts of tri(phenylethyl) phenol and 31 parts of triethylamine was reacted with 339 parts of $PCl_3$. After removing the amine hydrochloride and distilling off the solvent and unreacted $PCl_3$ and amine, the residue was dissolved in diethyl ether. This was then treated with a large volume of water and washed with additional water until the wash was chloride ion free. The ether solution was then dried. The primary phosphite was obtained in crude form as a viscous oil.

EXAMPLE 9

Preparation of primary 2,6-di-t-butylphenyl phosphite using calcium oxide

This example illustrates the preparation of 2,6-di-t-butylphenyl phosphite using calcium oxide as an acid acceptor. A mixture of 104 parts 2,6-di-t-butyl phenol, 214 parts $PCl_3$ and 62 parts calcium oxide was heated at reflux for ten hours, under a nitrogen atmosphere. After filtering off solids from the product, it was subjected to distillation and gave a fraction boiling at 135 to 168 degrees centigrade/10 millimeters of absolute pressure. On treatment with cold water, the primary phosphite of 2,6-di-t-butyl phenol was obtained which, after dissolving in aqueous alkali and precipitating with dilute hydrochloric acid, melted at 134.5 to 136.5 degrees centigrade.

EXAMPLE 10

Preparation of 2,6-di-t-butylphenylphosphite without acid acceptor

Example 9 was repeated, omitting the calcium oxide. The amount of HCl liberated was less than half the amount liberated in forming the 2,6-di-t-butylphenyl phosphite prepared in Example 9.

The actual yield of the phosphite in this example was 8 parts (6 percent of theory).

EXAMPLE 11

Preparation of 2,6-di-t-butylphenyldiphenylphosphite

To 9.0 parts of 2,6-dibutylphenyldichlorophosphoridite were added 5.1 parts phenol over a 15 minute period. The temperature was then maintained at 100 degrees centigrade for one hours. At this point, 82 percent of the calculated amount of HCl had been given off. The reaction mixture was then distilled under reduced pressure. 3.7 parts boiling at 200–202 degrees centigrade were collected. It contained 7.85 percent phosphorus. The calculated percentage of the element in 2,6-t-dibutylphenyldiphenylphosphite is 7.37 percent phosphorus.

Other metal halides other than phosphorus trihalides may also be used in the practice of the examples of the invention. For example, equimolar amounts of the halides of antimony, arsenic, silicon and boron such as antimony trichloride, arsenic trichloride, silicon tetrachloride, boron trichloride and the like may be used, to produce the corresponding antimony, arsenic, silicon and boron compounds.

EXAMPLE 12

Preparation of the sodium salt of 2,4,6-tri-t-butylphenyl phosphite

Three parts of 2,4,6-tri-t-butylphenyl phosphite were suspended in 200 parts of water. To this there was slowly added 0.368 part of NaOH dissolved in 100 parts of water. All of the phosphite dissolved. The water was then distilled off under vacuum, with the solution temperature maintained below 50 degrees centigrade until only 12 parts remained. Upon cooling, the colorless crystalline sodium salt precipitated. The product, sodium salt of 2,4,6-tri-t-butylphenyl phosphite, was soluble in water at 25 degrees centigrade to the extent of 19–20 percent.

EXAMPLE 13

Preparation of the lead salt of 2,4,6-tri-t-butylphenyl phosphite 326 parts of 2,4,6-tri-t-butylphenyl phosphite were slowly added to 2500 parts of water that contained 40 parts of NaOH. A solution of 162 parts of lead acetate in 1000 parts of water was then slowly added. A white solid formed immediately. Sufficient $CHCl_3$ was then added to dissolve the solid. The $CHCl_3$ layer was then separated and dried. Evaporation of the solvent left the lead salt in the form of a white powder. This melted in the range of 135 to 140 degrees centigrade. The powder was found to contain 24.5 percent lead. The calculated percentage of this element in the lead salt of 2,4,6-tri-t-butylphenyl phosphite is 24.1 percent lead.

EXAMPLE 14

Preparation of the calcium salt of 2,4,6-tri-t-butylphenyl phosphite 326 parts of 2,4,6-tri-t-butylphenyl phosphite were slowly added to 2500 parts of water that contained 40 parts of NaOH. Stirring was continued until all the phosphite dissolved. A solution of 55 parts of $CaCl_2$ dissolved in 1000 parts of water was then slowly added. A white solid formed immediately. This was filtered off, washed with water until free of chloride ion, and then was dried at 60 degrees centigrade under vacuum. The product does not melt, but decomposes at about 230 degrees centigrade under vacuum. The powder was found to contain 5.0 percent calcium. The calculated percentage of this element in the calcium salt of 2,4,6-tri-t-butylphenyl phosphite is 5.8 percent calcium. In this way, 242 parts of the calcium salt were obtained.

EXAMPLE 15

Preparation of the ammonium salt of 2,4,6-tri-t-butylphenyl phosphite 326 parts of the phosphite were added to 2000 parts of concentrated ammonium hydroxide and 4000 parts of water. The mixture was stirred and heated at 60 degrees centigrade until all the phosphite had dissolved. Upon cooling, the product crystallized in the form of white needles. These were filtered off and dried at room temperature under vacuum. 234 parts were obtained. The product appears to be a hydrate that loses its water of crystallization at about 130 degrees centigrade. The product was found to contain 3.51 percent nitrogen. The calculated percentage of this element in the trihydrated salt is 3.53 percent nitrogen.

EXAMPLE 16

Preparation of the zinc salt of 2,4,6-tri-t-butylphenyl phosphite

A solution of the sodium salt was made from 326 parts of the 2,4,6-tri-t-butylphenyl phosphite, 40 parts of sodium hydroxide and 2500 parts of water. To this there was slowly added 68 parts of zinc chloride dissolved in 1000 parts of water. A white solid formed immediately. This was filtered off, washed with water and dried at 60 degrees centigrade under 1 millimeter Hg vacuum. This procedure yielded 270 parts of the zinc salt. The product was found to contain 10.1 percent zinc. The calculated percentage of this element is 9.2 percent zinc.

EXAMPLE 17

Preparation of the iron salt of 2,4,6-tri-t-butylphenyl phosphite

A solution of the sodium salt was made from 326 parts of the 2,4,6-tri-t-butylphenyl phosphite, 40 parts of sodium hydroxide and 3000 parts of water. To this there was added a solution of 54 parts of ferric chloride in 500 parts of water. A light orange colored solid formed immediately. This was filtered off, washed with water, and dried at 60 degrees centigrade under vacuum. In this way, 270 parts of the iron salt was obtained. The solid product was found to contain 4.36 percent iron. The calculated percentage of this element is 4.4 percent iron. It melted in the range of 160 to 170 degrees centigrade.

EXAMPLE 18

Preparation of the nickel salt of 2,4,6-tri-t-butylphenyl phosphite

A solution of the sodium salt was prepared from 652 parts of the 2,4,6-tri-t-butylphenyl phosphite, 80 parts of sodium hydroxide and 4000 parts of water. To this there were slowly added 238 parts of nickel chloride $$(NiCl_2 \cdot 6H_2O)$$

dissolved in 2000 parts of water. A light green colored solid precipitated. This was filtered off, washed with water and dried. The nickel salt thus formed amounted to 700 parts.

EXAMPLE 19

Preparation of the tin salt of 2,4,6-tri-t-butylphenyl phosphite

A solution of the sodium salt was prepared from 652 parts of the 2,4,6-tri-t-butylphenyl phosphite, 80 parts of sodium hydroxide and 6000 parts of water. To this there were slowly added 226 grams of powdered tin chloride ($SnCl_2 \cdot 2H_2O$). A white precipitate formed. Sufficient chloroform was added to dissolve this solid. The chloroform layer was separated, dried and allowed to partially evaporate. 285 parts of white solid were then filtered off. This melted in the range of 125 to 130 degrees centigrade and was found to contain 16.6 percent tin. The calculated percentage of this element is 15.5 percent tin.

EXAMPLE 20

Preparation of the chromium salt of 2,4,6-tri-t-butylphenyl phosphite

A solution of the sodium salt was prepared from 652 parts of the 2,4,6-tri-t-butylphenyl phosphite, 80 parts of sodium hydroxide and 4000 parts of water. To this there were slowly added a solution of 264 grams of chromium trinitrate ($Cr(NO_3)_3 \cdot 9H_2O$) in 3500 parts of water. A light green precipitate formed. Sufficient diethyl ether was added to dissolve the solid. The ether layer was then separated, dried and allowed to evaporate. The green colored chromium salt was thus obtained in a yield of 685 parts.

When equimolar quantities of primary aryl phosphites such as 2,4-di-t-butylphenyl phosphite, 2,6-di-t-butyl-4-t-amylphenyl phosphite, 2,6-di-t-butyl-4-benzylphenyl phosphite, and the like, are used in place of 2,4,6-tri-t-butylphenyl phosphite in the foregoing Examples 12 through 20, the corresponding products and results are obtained.

The following table and Examples 21 through 26 illustrate typical hydrocarbon oil compositions.

TABLE I.—PROPERTIES OF REPRESENTATIVE PETROLEUM HYDROCARBON OILS

| | Oil | | | | | |
|---|---|---|---|---|---|---|
| | A | B | C | D | E | F |
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 41.0 | 465 | | | 365 | 385 |
| Sulfur, percent | 0.2 | 0.3 | 0.3 | 0.3 | 0.3 | 0.1 |

EXAMPLE 21

To 100,000 parts of Oil A is added with stirring 120 parts (0.12 percent) of mono-(2,6-di-tertiarybutylphenyl) phosphite. The resulting oil is found to possess greatly improved resistance to oxidative deterioration.

EXAMPLE 22

To 100,000 parts of Oil B is added 1000 parts (1 percent) of mono-(2,4,6-tri-tertiarybutylphenyl) phosphite. On agitating this mixture, a homogeneous solution results and the resulting oil composition possesses enhanced oxidation resistance.

EXAMPLE 23

With 100,000 parts of Oil C is blended 500 parts (0.5 percent) of mono-(2,4-di-tertiarybutylphenyl) phosphite. The resulting oil possesses enhanced resistance against oxidative deterioration.

EXAMPLE 24

To 100,000 parts of Oil D is added 1000 parts (1.0 percent) of mono-(2,6-di-tertiarybutyl-4-decylphenyl) phosphite. The resulting oil is found to possess enhanced resistance against oxidative deterioration.

EXAMPLE 25

With 100,000 parts of Oil E is blended 5000 parts (5 percent) of mono-(2,6-di-tertiarybutyl-4 - chlorophenyl) phosphite. After mixing, the resulting oil possesses enhanced resistance to oxidation.

EXAMPLE 26

To 100,000 parts of Oil F is added 250 parts (0.25 percent) of mono-(2,6-di-tertiarybutylphenyl) phosphite. The resulting oil possesses greatly enhanced resistance against oxidative deterioration. When the corresponding amounts of a salt such as the lead salt of 2,6-di-t-butyl-4-nonylphenyl phosphite, the nickel salt of 2,6-di-t-butylphenyl phosphite, the lead salt of 2,6-di-t-butyl-4-chlorophenyl phosphite, the lead salt of 2,4,6-tri-t-butylphenyl phosphite, the copper salt of 2,4,6-tri-phenylethylphenyl phosphite and the like are used in place of the phosphites of Examples 21 through 26, corresponding results are obtained.

EXAMPLE 27

Mono-(2,4,6-tri-tertiarybutylphenyl) phosphite 5 parts (0.5 percent) was added to 1000 parts of thermolyzed tung oil. This solution was painted on a glass plate and exposed to the atmosphere. A control was also made and the time required for the film to form a skin on its surface, indicating oxidation, was noted. After about 72 hours, it was noted that the control had formed a crust or film which was evidence of oxidation, whereas the phosphite treated thermolyzed tung oil showed no sign of a film. This indicates that the phosphites of the invention are strong anti-oxidants.

EXAMPLE 28

Example 28 illustrates the peroxidation inhibiting activity of the primary phosphites and primary phosphite salts of this invention when added to a hydrocarbon.

To 100 parts of 1,3,5-triisopropyl benzene was added 0.1 part of primary 2,6-di-tertiarybutylphenyl phosphite. The resulting solution was heated and maintained at 100 degrees centigrade for about 48 hours. Thereafter, the solution was cooled and the hydrogen peroxide content of the product was determined by a method described by Wagner, Smith and Peters in Analytical Chemistry, volume 19, pages 976 to 979 (1947). The product was found to contain 0.08 percent hydroperoxide.

EXAMPLE 29

Example 28 was repeated without the primary 2,6-di-t-butylphenyl phosphite. The product was found to contain about 13 percent hydrogen peroxide.

EXAMPLES 30 TO 36

The procedure of Example 28 was repeated utilizing an additive independently selected from those listed at Table II. The results obtained are also listed at Table II, as percent of hydroperoxide found in the additive containing hydrocarbon.

TABLE II

| Additive | Percent hydroperoxide in product |
|---|---|
| Example: | |
| 30 .... Primary 2,6-di-t-butylphenyl phosphite | 0.01 |
| 31 .... Primary 2,4,6-tri-t-butylphenyl phosphite | 0.01 |
| 32 .... Lead salt of primary 2,4,6-tri-t-butylphenyl phosphite—Pb($C_{18}H_{30}PO_3$)$_2$ | 0.04–0.06 |
| 33 .... Calcium salt of primary 2,4,6-tri-t-butylphenyl phosphite—Ca($C_{18}H_{30}PO_3$)$_2$ | 0.02–0.05 |
| 34 .... Primary 4-methyl-2,6-di-t-butyl phosphite | 0.01 |
| 35 .... Primary 4-chloro-2,6-di-t-butyl phosphite | 0.01 |
| 36 .... No additive | 13–20 |

EXAMPLE 37

Although copper and its compounds usually promote the oxidative degradation of polypropylene, a typical salt of our invention, namely, the copper salt of 2,4,6-tri-t-butylphenyl phosphite [Cu($C_{18}H_{30}PO_3$)$_2$], actually functions to protect the polymer. The tin salt of the same acid also behaves in the same way as illustrated by this example.

The mixtures indicated in the table below were blended from powdered ingredients in the proportions shown and then were baked in air at 175 degrees centigrade for 25 minutes as in Example 3. Results are shown in the table.

| | A, parts | B, parts | C, parts |
|---|---|---|---|
| Unstabilized polypropylene powder | 2.000 | 2.000 | 2.000 |
| Copper salt of 2,4,6-tri-t-butylphenyl phosphite Cu($C_{18}H_{30}PO_3$)$_2$ | | 0.002 | |
| Tin salt of 2,4,6-tri-t-butylphenyl phosphite Sn($C_{18}H_{30}PO_3$)$_2$ | | | 0.002 |
| Weight change | +0.004 | 0.000 | −0.002 |
| Properties of product | (1) | (2) | (3) |

[1] Very brittle.
[2] Flexible, fairly tough.
[3] Flexible, tough.

It is to be understood that the foregoing detailed description is merely given by way of illustration and is not intended to limit the scope of the invention in any way, for many variations may be made therein without departing from the spirit of the invention.

What is claimed is:

1. A composition of matter consisting essentially of an organic substance which deteriorates in the presence of an oxygen-containing gas, especially at elevated temperatures, and a minor proportion, sufficient to inhibit oxidation, of an added substance having the formula

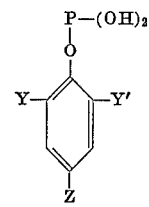

wherein Y and Y' are hydrocarbon radicals having from 4 to about 12 carbon atoms, Z is selected from the group consisting of halogen and hydrocarbon radicals having from 4 to about 12 carbon atoms.

2. A composition of matter in accordance with claim 1 wherein the organic substance is a petroleum hydrocarbon.

3. A composition in accordance with claim 1 wherein the organic substance comprises a polyolefin.

4. A composition according to claim 3 wherein said polyolefin includes at least a major amount of polypropylene.

5. A composition of matter consisting essentially of an organic substance which deteriorates in the presence of an oxygen-containing gas, especially at elevated temperatures, and a minor proportion, sufficient to inhibit oxidation, of an added substance having the formula

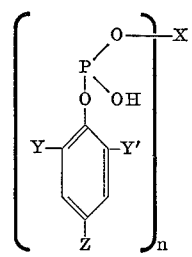

wherein Y and Y' are hydrocarbon radicals having from 4 to about 12 carbon atoms, Z is selected from the group consisting of hydrogen, halogen and hydrocarbon radicals having from 4 to about 12 carbon atoms, X is selected from the group consisting of ammonium, amine, quaternary ammonium radicals, and metal radicals, and $n$ is an integer from 1 to 4, representing the valence of X.

6. A composition of matter in accordance with claim 5 wherein the organic substance is a petroleum hydrocarbon.

7. A composition in accordance with claim 5 wherein the organic substance comprises a polyolefin.

8. A composition according to claim 7 wherein said polyolefin includes at least a major amount of polypropylene.

References Cited

UNITED STATES PATENTS

| | | | |
|---|---|---|---|
| 2,234,379 | 3/1941 | Martin | 252—49.8 XR |
| 2,241,243 | 5/1941 | Conary et al. | 252—49.8 |
| 2,413,353 | 12/1946 | Hunter et al. | 252—49.8 |
| 2,432,095 | 12/1947 | Frey | 252—32.5 XR |
| 2,612,488 | 9/1952 | Nelson | 260—45.7 XR |
| 2,728,791 | 12/1955 | Rowlands. | |
| 2,839,563 | 6/1958 | Hechenbleikner. | |
| 3,126,343 | 3/1964 | Wilson | 252—49.8 |
| 3,240,704 | 3/1966 | Nelson et al. | 252—49.8 XR |
| 3,281,381 | 10/1966 | Hechenbleikner et al. | 260—45.7 XR |

DANIEL E. WYMAN, Primary Examiner

I. VAUGHN, Assistant Examiner

U.S. Cl. X.R.

252—49.9, 400; 260—45.7, 45.9, 45.75

PO-1050
(5/69)

UNITED STATES PATENT OFFICE
CERTIFICATE OF CORRECTION

Patent No. 3,491,024          Dated January 20, 1970

Inventor(s) Francis M. Kujawa et al.

It is certified that error appears in the above-identified patent and that said Letters Patent are hereby corrected as shown below:

Column 7, line 13, "includes" should read --- include ---. Column 9, line 15, "36.7" should read --- 46.7 ---. Column 12, line 17, Table 1, Flash Point in Column A should read -- 410 ---.

SIGNED AND
SEALED
AUG 11 1970

(SEAL)
Attest:

Edward M. Fletcher, Jr.
Attesting Officer

WILLIAM E. SCHUYLER, JR.
Commissioner of Patents